United States Patent
Shimazoe et al.

(10) Patent No.: US 10,090,536 B2
(45) Date of Patent: Oct. 2, 2018

(54) SEAL STRUCTURE FOR FUEL BATTERY

(71) Applicant: NOK CORPORATION, Tokyo (JP)

(72) Inventors: Toshihiro Shimazoe, Makinohara (JP); Shigeru Watanabe, Fujisawa (JP)

(73) Assignee: NOK Corporation (JP)

( * ) Notice: Subject to any disclaimer, the term of this patent is extended or adjusted under 35 U.S.C. 154(b) by 482 days.

(21) Appl. No.: 14/892,030

(22) PCT Filed: May 13, 2014

(86) PCT No.: PCT/JP2014/062654
§ 371 (c)(1),
(2) Date: Nov. 18, 2015

(87) PCT Pub. No.: WO2014/192527
PCT Pub. Date: Dec. 4, 2014

(65) Prior Publication Data
US 2016/0111735 A1    Apr. 21, 2016

(30) Foreign Application Priority Data

May 27, 2013    (JP) .................................. 2013-110787

(51) Int. Cl.
*H01M 8/0271* (2016.01)
*H01M 8/0276* (2016.01)
(Continued)

(52) U.S. Cl.
CPC ....... *H01M 8/0271* (2013.01); *H01M 8/0247* (2013.01); *H01M 8/0276* (2013.01); *H01M 8/0284* (2013.01); *H01M 2008/1095* (2013.01)

(58) Field of Classification Search
None
See application file for complete search history.

(56) References Cited

U.S. PATENT DOCUMENTS

| | | | |
|---|---|---|---|
| 2002/0051902 A1 | 5/2002 | Suenaga et al. |
| 2011/0318665 A1 | 12/2011 | Yamamoto et al. |
| 2013/0089808 A1 | 4/2013 | Yoshikawa et al. |

FOREIGN PATENT DOCUMENTS

| | | |
|---|---|---|
| EP | 1223629 A1 | 7/2002 |
| JP | 2003-331873 A | 11/2003 |

(Continued)

OTHER PUBLICATIONS

Supplementary European Search Report for Patent Application No. EP 14803912.6 dated May 6, 2016 (5 pages).

*Primary Examiner* — Sarah A Slifka
(74) *Attorney, Agent, or Firm* — Harness, Dickey & Pierce, P.L.C.

(57) ABSTRACT

In a fuel battery seal structure, a gasket has a base portion fitted in a non-bonded manner to a seal installation groove of a separator, and a seal protrusion brought into close contact with a seal groove of a separator. Presser projections and clearance grooves are formed in both sides in a width direction of the seal groove. The presser projections are brought into contact with the base portion of the gasket, and the clearance grooves are positioned in an opposite side to the seal groove as seen from the presser projections. Sum of widths of the seal groove and the presser projections in both sides thereof is smaller than a width of the seal installation groove, and sum of widths of the seal groove, and the presser projections and the clearance grooves in both sides thereof is larger than the width of the seal installation groove.

4 Claims, 5 Drawing Sheets

(51) Int. Cl.
*H01M 8/0247* (2016.01)
*H01M 8/0284* (2016.01)
*H01M 8/1018* (2016.01)

(56) References Cited

FOREIGN PATENT DOCUMENTS

| | | |
|---|---|---|
| JP | 2005-108565 A | 4/2005 |
| JP | 2007-323984 A | 12/2007 |
| JP | 2009-026633 A | 2/2009 |
| JP | 2009-277957 A | 11/2009 |
| JP | 2011-222245 A | 11/2011 |
| WO | WO-2010-100906 A1 | 9/2010 |
| WO | WO-2011-158286 A1 | 12/2011 |

SEAL STRUCTURE FOR FUEL BATTERY

CROSS-REFERENCE TO RELATED APPLICATIONS

This application is a U.S. National Stage application of International Application No. PCT/JP2014/062654, filed on May 13, 2014, and published in Japanese as WO 2014/192527 A1 on Dec. 4, 2014. This application claims priority to Japanese Application No. 2013-110787, filed on May 27, 2013. The entire disclosures of the above applications are incorporated herein by reference.

BACKGROUND OF THE INVENTION

Field of the Invention

The present invention relates to a seal structure for a fuel battery.

Description of the Conventional Art

In the fuel battery, a fuel battery cell is constructed by laminating separators in both sides of a thickness direction of a membrane electrode assembly (MEA) which is provided with a pair of electrode layers in both surfaces of an electrolyte membrane, and the fuel battery is constructed as a stack structure by laminating a lot of fuel battery cells. Further, oxidation gas (air) is supplied to a cathode side of the membrane electrode assembly, fuel gas (hydrogen) is supplied to an anode side of the membrane electrode assembly, and an electric power is generated on the basis of an electrochemical reaction which is a counterreaction of an electrolysis of water, that is, a reaction which creates water from hydrogen and oxygen.

In this kind of fuel battery, a gasket for sealing the fuel gas, the oxidation gas, the water created by the electrochemical reaction mentioned above and the surplus are used in each of the fuel battery cells. More specifically, a gasket 103 made of a rubber-like elastic material (a rubber material or a synthetic resin material having a rubber-like elasticity) is retained to a seal installation groove 101a which is formed in one separator 101 among mutually laminated separators 101 and 102, and a seal protrusion 103a formed in a raised manner in the gasket 103 is brought into close contact with a seal groove 102a which is formed in the other separator 102, for example, as shown in FIG. 7.

In the case that a width of the seal installation groove 101a of the separator 101 is equal to a width of the seal groove 102a of the separator 102, a base portion 103b in a root of the gasket 103 bulges by a stress generated by compression deformation in a thickness direction of the seal protrusion 103a of the gasket 103 in a process of laminating and assembling the separators 101 and 102, and there is a risk that an end portion of the base portion 103b is bitten between groove shoulder portions of the separators 101 and 102.

Further, in order to prevent the end portion from being bitten, there has been known that a width Wb of the seal groove 102a of the separator 102 facing to the gasket 103 is set to be larger than a width Wa of the seal installation groove 101a of the separator 101, such as an example shown in FIG. 7. According to the structure mentioned above, it is possible to inhibit or avoid the end portion of the base portion 103b from being bitten between the groove shoulders of the separators 101 and 102 even if the base portion 103b bulges due to the compression stress of the seal protrusion 103a of the gasket 103 in the process of laminating and assembling the separators 101 and 102 (refer to Japanese Unexamined Patent Publication No. 2009-277957).

SUMMARY OF THE INVENTION

Problem to be Solved by the Invention

In the case that the seal installation groove 101a of the separator 101 is shallow, or in the case that an anchor action of the base portion 103b of the gasket 103 in relation to the seal installation groove 101a is weak, such as the example shown in FIG. 7, there is a risk that the base portion 103b bulges due to the compression stress of the seal protrusion 103a of the gasket 103 in the process of laminating and assembling the separators 101 and 102, as shown in FIG. 8, the gasket 103 is displaced within the groove in a width direction due to the internal pressure P as shown in FIG. 9, and there is a risk that a sealing function is lowered.

Further, in order to prevent the base portion 103b from bulging due to the compression stress of the seal protrusion 103a, it is thought that the width of the seal groove 102a of the separator 102 facing to the gasket 103 is made smaller than the width of the seal installation groove 101a of the separator 101 contrary to the example shown in FIG. 7, however, in this case, there is a risk that the base portion 103b bulges due to the compression stress of the seal protrusion 103a of the gasket 103 in the process of laminating and assembling the separators 101 and 102 and the end portion 103c of the base portion 103b is finally bitten between the groove shoulders of the separators 101 and 102, as shown in FIG. 10.

The present invention is made by taking the point mentioned above into consideration, and a technical subject of the present invention is to provide a fuel battery seal structure which can inhibit and avoid a base portion from bulging due to a compression stress of a seal protrusion of a gasket and inhibit and avoid an end portion of the base portion from being bitten between separators in the process of laminating and assembling the separators.

Means for Solving the Problem

As a means for effectively solving the technical subject mentioned above, a seal structure for a fuel battery according to the invention in the first aspect of the current disclosure is a seal structure for a fuel battery structured such that a gasket made of a rubber-like elastic material is installed to a seal installation groove formed in one separator among separators which are laminated with each other and face to each other in a thickness direction, and the gasket has a base portion which is fitted in a non-bonded manner to the seal installation groove, and a seal protrusion which is formed in a raised manner in the base portion and is brought into close contact with a seal groove formed in the other separator, wherein presser projections and clearance grooves are formed in both sides in a width direction of the seal groove, the presser projections being brought into contact with the base portion of the gasket, and the clearance grooves being positioned in an opposite side to the seal groove as seen from the presser projections, sum of widths of the seal groove and the presser projections in both sides of the seal groove is smaller than a width of the seal installation groove, and sum of widths of the seal groove, and the presser projections and the clearance grooves in both sides of the seal groove is larger than the width of the seal installation groove. The rubber-like elastic material means a rubber material or a synthetic resin material having a rubber-like elasticity.

A seal structure for a fuel battery according to the invention of a second aspect of the current disclosure is the structure described in the first aspect of the current disclosure, wherein the presser projection has an interference in relation to the base portion of the gasket.

A seal structure for a fuel battery according to the invention of a third aspect of the current disclosure is the structure described in the first or second aspect of the current disclosure, wherein a groove depth of the clearance groove is smaller than a thickness of the base portion of the gasket.

Effect of the Invention

On the basis of the seal structure for the fuel battery according to the present invention, the seal protrusion comes into pressure contact with the seal groove in the process of laminating and assembling the separators, and the base portion of the gasket is going to bulge due to the stress according to the compression, however, the base portion is pressed by the presser projections in both sides in the width direction of the seal groove. Further, even if the end portion of the base portion protrudes out of the seal installation groove, it is possible to effectively inhibit or avoid the end portion of the base portion from being bitten between the separators since the groove shoulder of the seal installation groove faces to the clearance grooves.

Further, in the case that the presser projection has the interference in relation to the base portion of the gasket, it is possible to further enhance the pressing action against the base portion of the gasket.

Further, in the case that the groove depth of the clearance groove is made smaller than the thickness of the base portion of the gasket, the base portion of the gasket is hard to enter into the clearance groove, and it is accordingly possible to prevent the gasket from being displaced in the width direction due to the internal pressure.

DETAILED DESCRIPTION OF PREFERRED EMBODIMENTS

A description will be given of preferable embodiments of a seal structure for a fuel battery according to the present invention with reference to the accompanying drawings. First of all, FIGS. 1 and 2 show a first embodiment.

Figure 1:
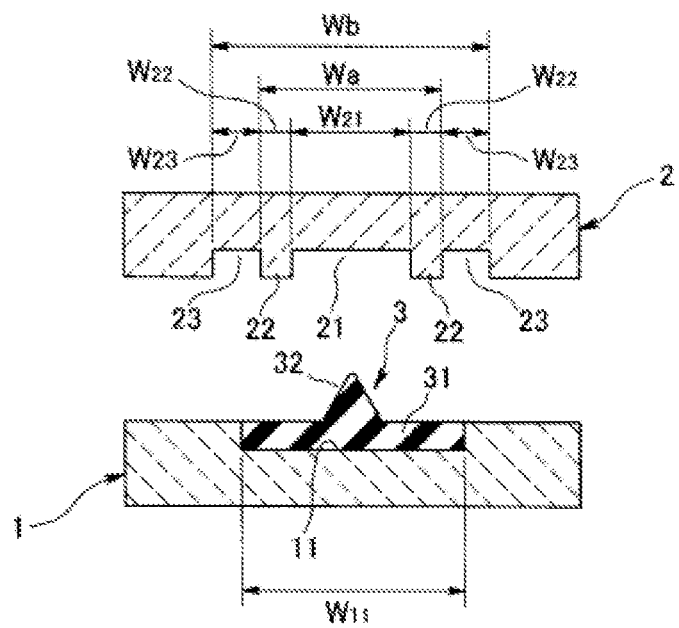
FIG. 1 is a partial cross-sectional view of a non-laminated state and shows a first preferable embodiment of a seal structure for a fuel battery according to the present invention.
Figure 2:
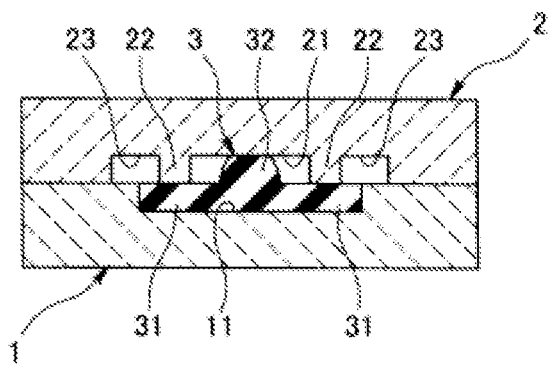
FIG. 2 is a partial cross-sectional view of a laminated state and shows the first preferable embodiment of the seal structure for the fuel battery according to the present invention.

In a non-laminated state shown in FIG. 1, reference numeral 1 denotes one separator constructing a fuel battery cell, and reference numeral 2 denotes the other separator. A seal installation groove 11 is formed in a facing surface to the other separator 2 in the one separator 1, and a gasket 3 is installed to the seal installation groove 11.

The gasket 3 formed by a rubber-like elastic material is fitted in a non-bonded manner to the seal installation groove 11 in the separator 1 so as to bury the seal installation groove 11, and has a flat base portion 31 in which an upper surface thereof is approximately flush with a groove shoulder of the seal installation groove 11, and a seal protrusion 32 which is formed in a raised manner in an intermediate portion in a width direction of the base portion 31.

In a facing surface to the one separator 1 in the other separator 2, there are formed a seal groove 21 which faces to the intermediate portion in the width direction of the seal installation groove 11 in the separator 1 and in which the seal protrusion 32 of the gasket 3 is brought into close contact with a base surface in an appropriately compressed state, presser projections 22 and 22 which are positioned in both sides in a width direction of the seal groove 21 and are brought into contact with the base portion 31 of the gasket 3, and clearance grooves 23 and 23 which are positioned in an opposite side to the seal groove 21 as seen from the presser projections 22 and 22.

A width $W_{21}$ of the seal groove 21 of the separator 2, that is, a width between the presser projections 22 and 22 is set to a range that a filling rate of the seal protrusion 32 of the gasket 3 in relation to the seal groove 21 does not go beyond 100% in a compressed state caused by the lamination. Further, sum $W_{21}+W_{22}\times 2$ (=Wa) of widths of the seal groove 21 and the presser projections 22 and 22 in both sides of the seal groove 21 is smaller than a width $W_{11}$ of the seal installation groove 11 of the separator 1, and sum $W_{21}+W_{22}\times 2+W_{23}\times 2$ (=Wb) of widths of the seal groove 21, and the presser projections 22 and 22 and the clearance grooves 23 and 23 in both sides of the seal groove 21 is larger than the width $W_{11}$ of the seal installation groove 11. Further, a depth of the seal groove 21, a depth of the clearance groove 23 and a height of the presser projection 22 are the same.

As a result, in the process of laminating and assembling the separators 1 and 2, the seal protrusion 32 of the gasket 3 first of all comes into pressure contact with the bottom surface of the seal groove 21, the base portion 31 of the gasket 3 bulges from the seal installation groove 11 due to the stress according to the compression, and is going to lift up. However, the base portion 31 is pressed by the presser projections 22 and 22 in both sides of the seal groove 21 as shown in FIG. 2. Further, since the relationship Wa<$W_{11}$<Wb is established, both ends of the base portion 31 face to the clearance groove 23. Therefore, it is possible to effectively inhibit or avoid the end portion of the base portion 31 of the gasket 3 from being bitten between the separators 1 and 2.

Figure 3:
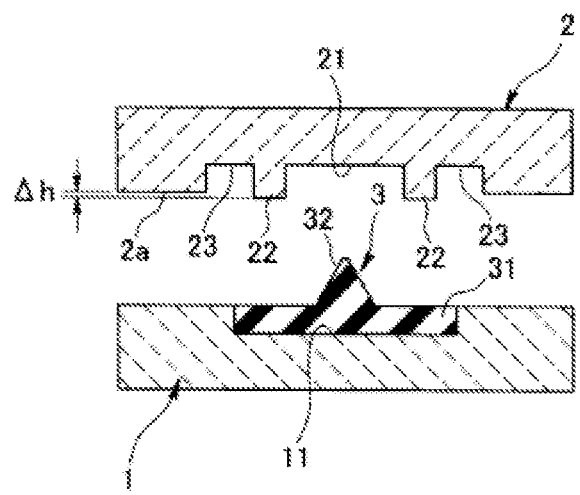
FIG. 3 is a partial cross-sectional view of a non-laminated state and shows a second preferable embodiment of the seal structure for the fuel battery according to the present invention.
Figure 4:
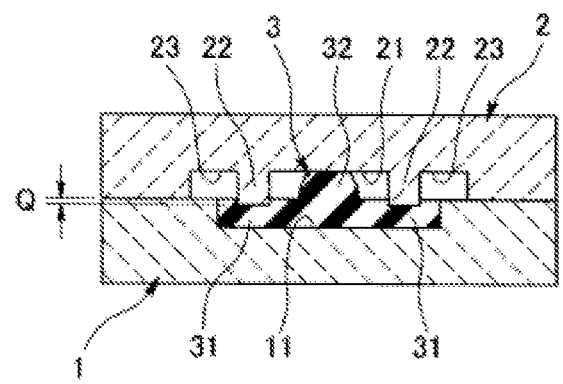
FIG. 4 is a partial cross-sectional view of a laminated state and shows the second preferable embodiment of the seal structure for the fuel battery according to the present invention.

Next, FIGS. 3 and 4 show a second embodiment. The embodiment is different from the first embodiment mentioned above in a matter that the height of the presser projection 22 is Δh higher than a laminated surface 2a with the separator 1 in the separator 2 and the presser projection 22 is accordingly structured such as to come into contact with the base portion 31 of the gasket 3 with an interference Q under a laminated state shown in FIG. 4. The other structures are the same as those of the first embodiment.

According to the structure mentioned above, since the pressing force of the presser projection 22 in relation to the base portion 31 of the gasket 3 becomes higher, it is possible to effectively prevent the gasket 3 from being displaced in the width direction due to the internal pressure.

Since the load applied to the separators 1 and 2 due to the lamination becomes greater as the interference Q of the presser projection 22 is greater, Δh is properly set while taking this into consideration.

Figure 5:
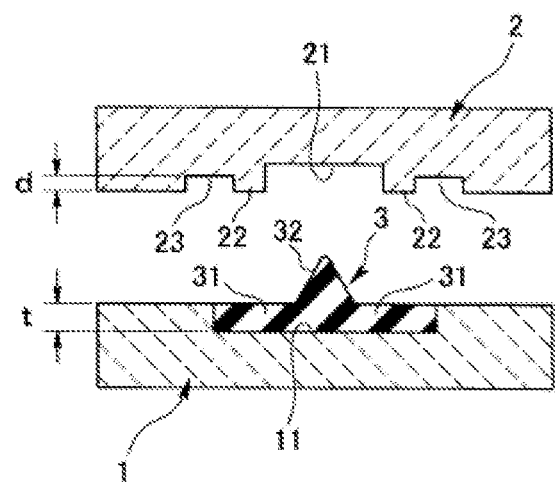
FIG. 5 is a partial cross-sectional view of a non-laminated state and shows a third preferable embodiment of the seal structure for the fuel battery according to the present invention.
Figure 6:
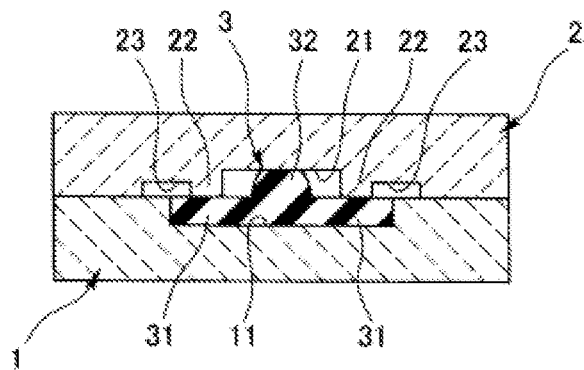
FIG. 6 is a partial cross-sectional view of a laminated state and shows the third preferable embodiment of the seal structure for the fuel battery according to the present invention.
Figure 7:
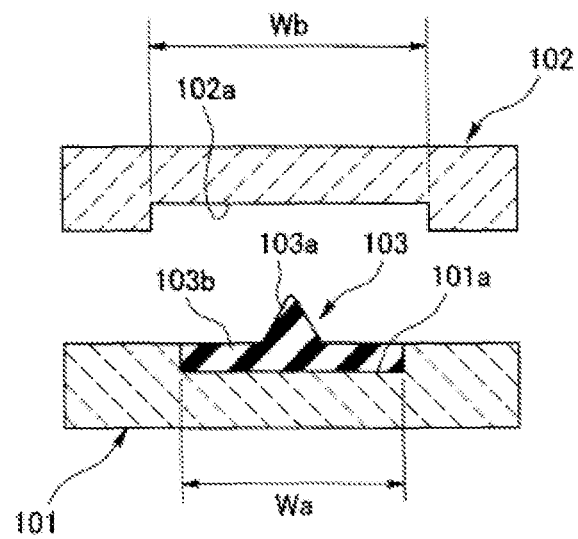
FIG. 7 is a partial cross-sectional view of a non-laminated state and shows an example of a seal structure for a fuel battery according to a prior art.
Figure 8:
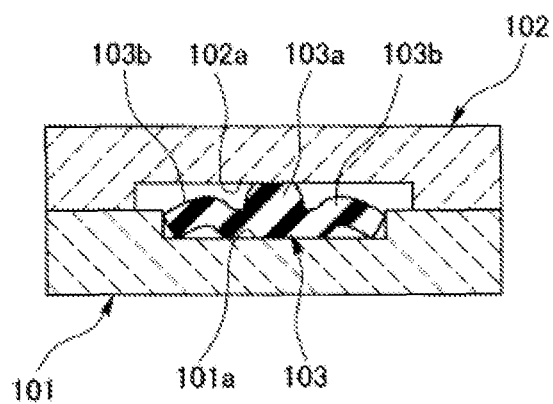
FIG. 8 is a partial cross-sectional view showing a state in which a gasket is deformed by lamination in the example of the seal structure for the fuel battery according to the prior art.
Figure 9:
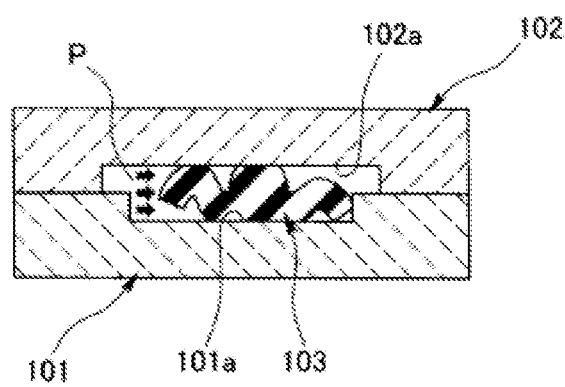
FIG. 9 is a partial cross-sectional view showing a state in which the gasket is deformed by the lamination and is displaced by an internal pressure in the example of the seal structure for the fuel battery according to the prior art.
Figure 10:
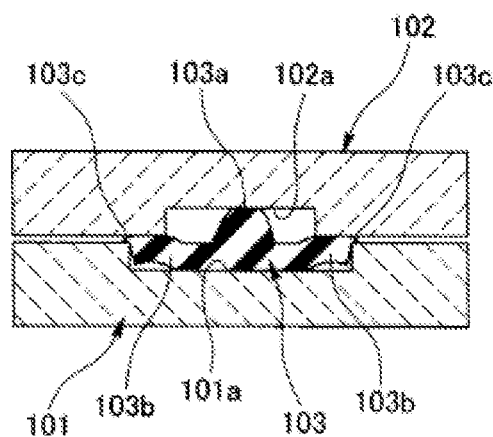
FIG. 10 is a partial cross-sectional view showing a state in which a gasket is deformed by lamination, in the other example of the seal structure for the fuel battery according to the prior art.

Next, FIGS. 5 and 6 show a third embodiment. The embodiment is different from the first embodiment described previously in a matter that a groove depth d of the clearance groove 23 in the separator 2 is made smaller than a thickness t of the base portion 31 of the gasket 3 (≅a depth of the seal installation groove 11). The other structures are the same as those of the first embodiment.

According to the structure mentioned above, since the base portion 31 of the gasket 3 is hard to enter into the clearance groove 23 even if the gasket 3 is exposed to the internal pressure, it is possible to prevent the gasket 3 from being displaced in the width direction.

The third embodiment can be structured such that the interference in relation to the base portion 31 of the gasket 3 is set in the presser projection 22 in the same manner as the second embodiment.

What is claimed is:

1. A seal structure for a fuel battery structured such that a gasket made of a rubber-like elastic material is installed to a seal installation groove formed in one separator among separators which are laminated with each other and face to each other in a thickness direction, and the gasket has a base portion which is fitted in a non-bonded manner to said seal installation groove, and a seal protrusion which is formed in a raised manner in the base portion and is brought into close contact with a seal groove formed in the other separator, wherein presser projections and clearance grooves are formed in both sides in a width direction of said seal groove, the presser projections being brought into contact with the base portion of said gasket, and the clearance grooves being positioned in an opposite side to said seal groove as seen from the presser projections, sum of widths of said seal groove and the presser projections in both sides of the seal groove is smaller than a width of said seal installation groove, and sum of widths of said seal groove, and the presser projections and the clearance grooves in both sides of the seal groove is larger than the width of said seal installation groove.

2. The seal structure for the fuel battery according to claim 1, wherein the presser projection has an interference in relation to the base portion of the gasket.

3. The seal structure for the fuel battery according to claim 1, wherein a groove depth of the clearance groove is smaller than a thickness of the base portion.

4. The seal structure for the fuel battery according to claim 2, wherein a groove depth of the clearance groove is smaller than a thickness of the base portion.

\* \* \* \* \*